April 7, 1942.　　　H. W. FOWLER　　　2,278,776
PNEUMATIC GAUGE AND INFLATER MECHANISM
Filed Oct. 31, 1938
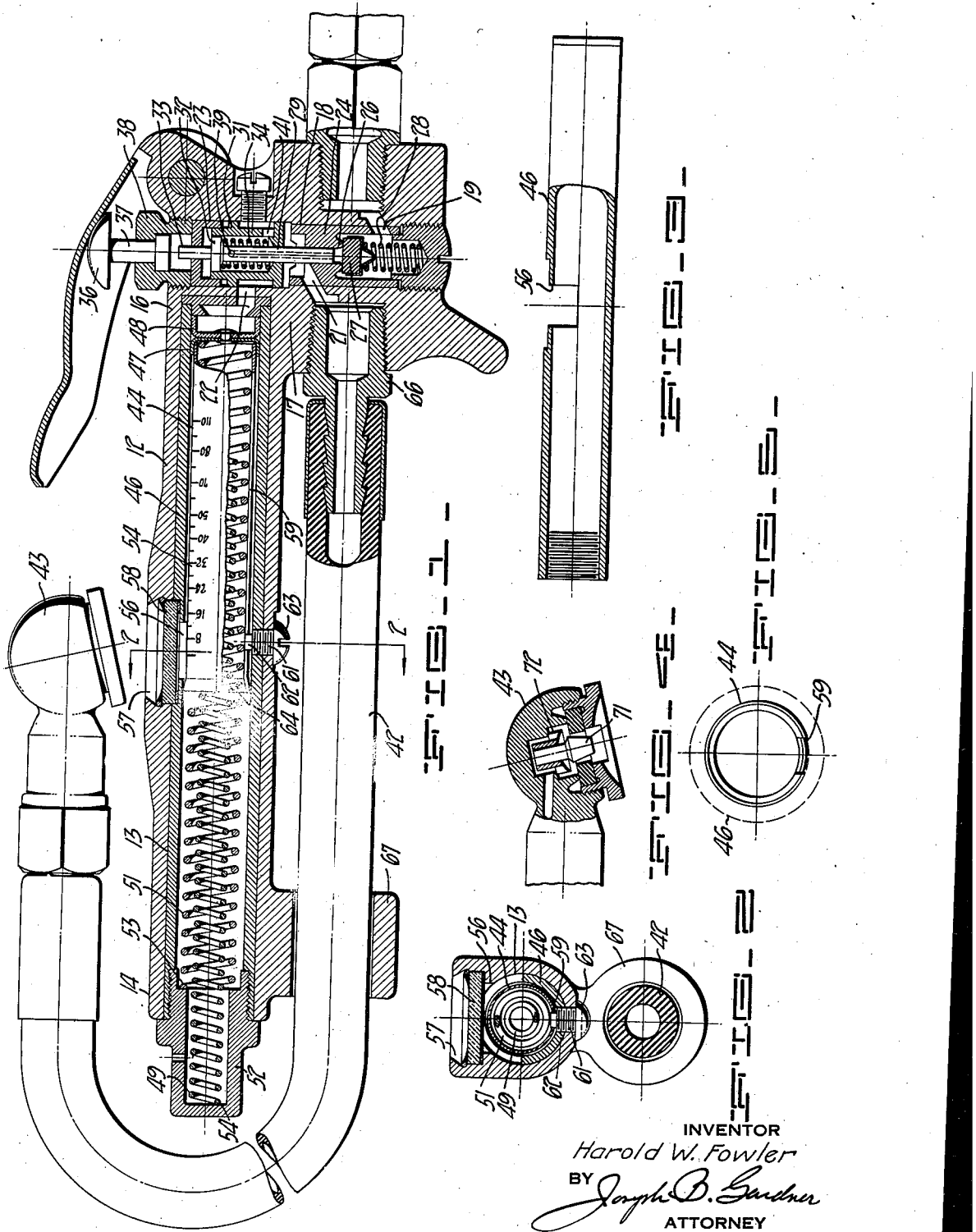
INVENTOR
Harold W. Fowler
BY
ATTORNEY Patented Apr. 7, 1942

2,278,776

UNITED STATES PATENT OFFICE 2,278,776

PNEUMATIC GAUGE AND INFLATER MECHANISM

Harold W. Fowler, Oakland, Calif.

Application October 31, 1938, Serial No. 237,814

1 Claim. (Cl. 73—111)

The invention relates to a pneumatic gauge and inflator mechanism such as commonly used in gasoline service or filling stations, garages and the like for filling and gauging pneumatic tires.

It is customary to construct an inflator of the character described of a unitary body containing both a gauge mechanism and an air inflator valve and to so fashion the body that the same will comfortably fit the hand of the user so that the valve may be conveniently and readily operated to either fill the tire or connect the tire to the gauge for reading the pressure of the air in the tire. The inflator device is usually equipped with a relatively short, flexible discharge conduit which is equipped at the discharge end thereof with a chuck for engaging the valve stem of the tire. The inflator body is adapted for connection to a longer flexible conduit leading to a source of air under pressure. By so fashioning the inflator mechanism, it is convenient for the operator to hold the inflator body in one hand and operate the valve mechanism with the thumb or fingers of the same hand, while having the other hand free for applying the chuck to the tire valve stem.

One of the objects of the present invention is to provide a pneumatic gauge and inflator mechanism of the character described having an improved and simplified construction of the gauge.

Another object of the present invention is to associate the discharge conduit of the inflator mechanism in such a manner with the body of the mechanism as to shield and partially conceal one of the parts of the gauge mechanism used to prevent relative rotation of the gauge piston and the gauge cylinder.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing:

Figure 1 is a longitudinal sectional view of a pneumatic gauge and inflator mechanism constructed in accordance with the present invention.

Figure 2 is a cross-sectional view taken substantially on the plane of line 2—2 of Figure 1.

Figure 3 is a side elevation shown partly in section of a part of the gauge mechanism.

Figure 4 is a cross-sectional view of the tire valve engaging chuck.

Figure 5 is an end elevation of another part of the gauge mechanism.

With reference more specifically to the accompanying drawing, the pneumatic gauge and inflator mechanism of the present invention comprises a body having an elongated portion 12 formed with a longitudinal bore 13 therein extending from one end 14 of said portion to adjacent an opposite end 16 thereof. Joined to the longitudinal portion 12 at the end 16 thereof is a transversely extending portion 17, which is formed with a bore 18 therethrough and inlet and discharge passages 19 and 21 adapted for connection to a source of air under pressure and to an object to be inflated respectively. The body is also provided with a passage 22 connecting the bore 18 to the adjacent end 23 of the bore 13.

In accordance with the present construction, the elongated portion 12 forms a housing for a pneumatic gauge while the transverse portion 17 forms a housing for a valve mechanism for selectively connecting the discharge passage 21 to the inlet passage 19 or to the gauge passage 22 for gauging the air pressure of a tire or the like when the chuck is applied thereto, or for venting the gauge passage 22 to the atmosphere, when the chuck is not so applied. The valve mechanism here shown consists of a valve supporting member 24 mounted in the bore 18 and which is formed with a seat 26 intermediate the passages 19 and 21 for receipt of a valve 27, which is normally urged by a spring 28 to a seated position against the seat 26. Carried centrally through the member 24 and extending longitudinally through the bore 18 is a hollow tubular valve stem 29, which is centered intermediate its length and above the passage 21 by a spool 31 and is formed adjacent its upper end with an enlargement 32 slidably mounted within the spool and having an upwardly projecting portion 33. The stem is normally elevated from the valve 27 by means of a spring 34 compressed in the interior of the spool 31 and engaged under the enlargement 32. A manually operated button 36 having a shaft portion 37 extended through a cap 38 closing the upper end of bore 18 is depressed against the stem 29 to unseat the valve 27. When the valve is so unseated, air may pass from the inlet passage 19 around the valve and around the stem 29 to the discharge passage 21. Upon release of the button 36, the valve 27 will return to its normal seated position under the influence of the applied air pressure and the spring 28, and the stem 29 will be lifted from the valve by spring 34. The air may then return from the tire by way of passage 21, then around the valve stem to the base thereof and up through a center passage therein to a side vent 39, where the air is liberated into the interior of the spool 31 and passes out through a side passage 41 in the spool, which is in registration with passage 22 to the gauge mechanism. Upon disconnection of the discharge passage 21 to the tire, the air in the gauge bore will be released back through this passage to the atmosphere. Also, where the valve stem is again depressed after gauging of the air pressure, the portion 33 of the valve stem is so mounted as to allow the venting of air around the stem when the latter is depressed.

The discharge passage 21 is here shown connected by means of a conduit 42 to a chuck 43 for connection of the discharge opening to a tire valve stem or the like. The chuck 43 is provided with a movable center piece 71 which is adapted to engage and displace the tire valve stem and is held to a limited movement by transverse shoulders 72 which are appropriately spaced from each other to allow the free passage of air through the chuck for inflating the tire when applied to the tire valve stem and for venting the discharge passage to the atmosphere when removed from the tire valve stem.

One of the principal features of the present invention and as hereinbefore noted, is the construction of the gauge mechanism here used. In the present form of gauge, a gauge piston 44 of generally cylindrical form is reciprocally mounted in the bore 13 and if desired and as here shown, a bearing tube 46 may be interposed between the piston and the bore side wall. The gauge piston is here in the form of an elongated cylinder having a closed end 47 sealed in the tube 46 by means of a packing washer 48 adjacent the air inlet end of the bore, so as to render the movement of the gauge piston responsive to the pressure of air entering the bore. The movement of the piston is resiliently resisted by a pair of helical springs 49 and 51 mounted one within the other and extending longitudinally through the bore 13 from the closed end 47 of the piston to a closure 52 at the end 14 of the gauge body. The closure 52 is so formed as to normally engage one end 53 of spring 51 so that the initial movement of the gauge piston is resisted by spring 51 and is recessed so as to engage the end 54 of spring 49 only after the gauge piston has been moved a portion of its gauging distance, so that for the remainder of the distance of movement of the gauge piston, the same is resisted by both springs 49 and 51 to decrease the increment of movement for a corresponding increase of pressure.

The gauge piston is provided with a plurality of longitudinal calibrations 54 which are aligned longitudinally for passage by aligned gauge sight openings 56 and 57 in the tube 46 and gauge body 12. Preferably, a transparent closure 58 is mounted in the sight opening 57 for sealing the gauge bore. In accordance with the present invention means is provided for preventing a relative rotational displacement of the gauge piston in the bore and for holding the calibrations in longitudinal alignment with the sight opening. In the present construction such means is considerably simplified from that heretofore used and consists simply in a longitudinal guide on one of the members and a pin engaging the guide on the other member. As here shown, the longitudinal guide is provided on the gauge piston in the form of an elongated slot 59 and the pin is carried by the wall of the gauge body 12, and is here in the form of a screw 61 threaded through the body wall and having the inner end 62 thereof extended through the tube 46 and engaged in the slot 59. The outer end of the screw is formed with a conventional slotted head 63 so as to facilitate retraction of the screw from the slot in the gauge piston when necessary, for dismembering of the gauge. The slot 59 in the gauge piston preferably extends for substantially the full length of the piston, as indicated in Figure 1, and opens to the open end 64 of the skirt of the gauge piston and extends longitudinally therefrom to the closed end 47 of the piston.

In order to prevent unauthorized tampering with the gauge mechanism and also to prevent accidental release of the screw 61, I preferably associate the discharge conduit 42 in such relation to the gauge body as to cover and conceal the screw head 63. As here shown, the conduit 42 is connected by means of a fitting 66 to the discharge passage 21 and extends longitudinally therefrom in parallel relation to the elongated gauge body portion 12, and is supported adjacent the end 14 of the gauge body by means of a ring-like conduit support 67, here formed integrally with the gauge body. In accordance with the present construction the screw 63 and the discharge passage 21 and the conduit support 67 are all arranged in a substantially common transverse plane, so that the conduit will extend directly across the head of the screw in spaced opposed position thereto, thereby preventing an accidental removal of the screw or unauthorized access thereto.

While I have shown the guide pin mounted on the stationary part and the longitudinal guide slot on the movable part, and for the reasons above pointed out prefer such construction, I may nevertheless reverse the guide parts so as to place the longitudinal guide slot on the stationary wall of the cylinder of the gauge body and the guide pin on the gauge piston. Also, as will be understood, a plurality of such guide slots and pins may be used at circumferentially spaced portions of the piston and cylinder if desired.

I claim:

In a device of the character described a body composed of an elongated portion and a lateral offset portion at one end of said elongated portion and being formed with a longitudinal bore in said elongated portion and with an air discharge passage in said lateral portion opening to a side thereof adjacent said elongated portion and having the axis thereof at said side substantially parallel to said elongated portion, an elongated gauge piston reciprocally mounted in said bore, means for preventing relative rotation of said piston in said bore and including a longitudinal slot in said piston and a screw threaded through the wall of said elongated body portion with the head of said screw at the outside of said body and the opposite end of said screw projecting into said bore and engaging in said slot, the axis of said screw being at substantially right angles to and substantially intersecting the axis of said air discharge passage, a conduit connected to said air discharge passage and adapted for connection to a tire or other object to be inflated, and means attached to the elongated portion of the body supporting said conduit substantially axially of said discharge passage whereby the said conduit is mounted across and covers the head of said screw.

HAROLD W. FOWLER.